(12) United States Patent
Howell

(10) Patent No.: US 12,371,156 B2
(45) Date of Patent: Jul. 29, 2025

(54) CONTROL SYSTEM

(71) Applicant: Airbus Operations Limited, Bristol (GB)

(72) Inventor: George Howell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 810 days.

(21) Appl. No.: 17/213,455

(22) Filed: Mar. 26, 2021

(65) Prior Publication Data

US 2021/0300528 A1 Sep. 30, 2021

(30) Foreign Application Priority Data

Mar. 27, 2020 (GB) ..................... 2004525

(51) Int. Cl.
*B64C 19/02* (2006.01)
*B64F 5/60* (2017.01)

(52) U.S. Cl.
CPC ............... *B64C 19/02* (2013.01); *B64F 5/60* (2017.01)

(58) Field of Classification Search
CPC ..... B64C 19/02; B64C 13/503; B64C 13/505; B64C 13/50; B64F 5/60; Y02T 50/40; G05D 1/0808
See application file for complete search history.

(56) References Cited

U.S. PATENT DOCUMENTS

| | | | |
|---|---|---|---|
| 6,114,976 A * | 9/2000 | Vian | B64D 25/10 340/963 |
| 6,332,105 B1 | 12/2001 | Calise et al. | |
| 6,567,727 B2 | 5/2003 | Westphal | |
| 10,423,158 B1 * | 9/2019 | Hadlich | G07C 5/0808 |
| 2005/0033489 A1 * | 2/2005 | Tezuka | G05D 1/0684 701/16 |

(Continued)

FOREIGN PATENT DOCUMENTS

| | | |
|---|---|---|
| CN | 107272683 | 10/2017 |
| EP | 3255437 | 12/2017 |

(Continued)

OTHER PUBLICATIONS

Combined Search and Examination Report cited in GB 2004525.8, Dec. 14, 2020, 11 pages.

(Continued)

*Primary Examiner* — Michael J Dalbo
(74) *Attorney, Agent, or Firm* — Nixon & Vanderhye P.C.

(57) ABSTRACT

An aircraft control system (100) including an aircraft control module (110), a trained classifier module (120), and an aircraft control processing engine (13). The aircraft control module (110) generates first control outputs (104a to 104c) based on received aircraft operating inputs (102a to 102d). The trained classifier module receives the aircraft operating inputs (102a to 102d) and generates second control outputs (104d to 104f). The aircraft control processing engine (130) receives the first control outputs (104a to 104c) and the second control outputs (104d to 104f) and generates operating control outputs (106a to 106c), based on the received first control outputs and second control outputs. The aircraft control processing engine (130) then controls the aircraft using the operating control outputs (106a to 106c).

24 Claims, 5 Drawing Sheets

(56) References Cited

U.S. PATENT DOCUMENTS

| | | | | |
|---|---|---|---|---|
| 2009/0299496 | A1* | 12/2009 | Cade | G05B 17/02 |
| | | | | 700/29 |
| 2014/0257603 | A1* | 9/2014 | McKeown | G08G 5/0021 |
| | | | | 701/16 |
| 2017/0358152 | A1* | 12/2017 | Atalla | G01P 21/025 |
| 2017/0369190 | A1* | 12/2017 | Ethington | B64F 5/60 |
| 2018/0268722 | A1* | 9/2018 | Meier | G01C 21/005 |
| 2018/0297573 | A1* | 10/2018 | Alam | B60T 17/221 |
| 2018/0322365 | A1 | 11/2018 | Yehezkel Rohekar | |
| 2019/0107846 | A1 | 4/2019 | Roy et al. | |
| 2020/0309810 | A1* | 10/2020 | Carvalho | G01P 21/025 |

FOREIGN PATENT DOCUMENTS

| | | |
|---|---|---|
| EP | 3378784 | 9/2018 |
| WO | 0235185 | 5/2002 |
| WO | 2019071327 | 4/2019 |
| WO | 2019094843 | 5/2019 |

OTHER PUBLICATIONS

"Implementing The New System, IGCSE ICT", https://www.igcseict.info/theory/8/implem/index.html, Mar. 24, 2021, 3 pages.

Hartmut Berhens: "Specification, Design and Implementation Of A Flight Control Unit For An Unmanned Aerial Vehicle" Department of Electrical and Electronic Engineering, Thesis (MEng)—Stellenbosch University, Dec. 2015, 109 pages.

Robert Stengel: "Intelligent Flight Control Systems" NASA. Langley Research Center, Joint University Program for Air Transportation Research, 1992-1992 https://ntrs.nasa.gov/citations/19930013387, 24 pages.

AAE: "More Automated, Connected Aviation by 2050" AAE Dossier #42, 2018 https://academieairespace.com/wp-content/uploads/2018/05/AAE_Dossier-42_WEB_EN.pdf, 117 pages.

Napolitano M R et al: Neural-Network-Based Scheme For Sensor Failure Detection, Identification, and Accommodation Journal of Guidance and Control and Dynamics, vol. 18, No. 6, Nov. 1, 1995, pp. 1280-1286, XP000558637, ISSN: 0731-5090, 8 pages.

* cited by examiner

CONTROL SYSTEM

RELATED APPLICATION

This application claims priority to United Kingdom Patent Application GB 2004525.8, filed Mar. 27, 2020, the entirety of which is incorporated by reference.

TECHNICAL FIELD

The present disclosure relates to aircraft control systems. In particular, but not exclusively, the present disclosure relates to aircraft control systems comprising trained classifiers.

BACKGROUND

Aircraft typically comprise control systems, which are developed by devising rules to govern the operation of the aircraft control system in a range of scenarios and coding these rules into the aircraft control system. Developing these control systems generally involves a considerable amount of time and planning. While techniques involving artificial intelligence may be employed and may decrease the time taken to develop such systems, sufficient trust has to be afforded to such techniques before they are considered to be safe.

SUMMARY

A first aspect of the present invention provides an aircraft control system comprising: an aircraft control module adapted to receive aircraft operating inputs and, based on the received aircraft operating inputs, generate first control outputs for controlling an aircraft; a trained classifier module adapted to receive the aircraft operating inputs and generate second control outputs for controlling the aircraft; and an aircraft control processing engine adapted to: receive the first control outputs and the second control outputs; determine a first control value representing at least one of the first control outputs and a second control value representing at least one of the second control outputs; determine an operating control value, at a distance between the first and second control values, the distance being determined by an authority parameter; using the determined operating control value to generate operating control outputs; and control the aircraft using the operating control outputs.

In this way, the aircraft may be controlled according to outputs from both a first control module, for example which is already in operation on a plurality of aircraft, and a new trained classifier, which has been trained to control the aircraft. This allows testers and pilots of the aircraft to evaluate the performance of the trained classifier and gain confidence that its introduction into the aircraft is safe. This may also allow regulators and testers to monitor and evaluate the differences in operation of the aircraft between the aircraft control module and the trained classifier module.

Optionally, the aircraft processing engine is adapted to evaluate the controlling of the aircraft using the operating control outputs and update the authority parameter based on the evaluation of the controlling of the aircraft using the operating control outputs.

Where there is a difference in control offered by the control module and the new trained classifier, this may allow the control of the aircraft to be gradually transferred from the aircraft control module to the trained classifier. By updating the authority parameter based on the evaluation, it is possible to increase or decrease the authority afforded to the trained classifier based on performance. For example, the system may be configured such that the authority of the trained classifier is only increased if an evaluation of the performance shows that the trained classifier module performs better than the aircraft control module.

Optionally, the authority parameter comprises a weight value and generating the operating control value comprises generating a function of, for example a weighted average of, the first control value and the second control value.

This may provide an effective way of generating the operating control value and implementing the authority control parameter.

Optionally, updating the authority parameter comprises at least one of incrementing or decrementing the weight value.

Incrementing or decrementing the weight value may provide a reliable way of tracking and updating the authority parameter and allows the authority of the trained classifier module to be both increased and decreased.

Optionally, an amount by which the weight value is incremented or decremented depends on the evaluating of the controlling of the aircraft.

In this way, the changes to the weight value may be scaled commensurately with the performance of the aircraft. For example, where the trained classifier module improves the performance of the aircraft by a significant margin in a given scenario, or test, the amount of authority which is afforded or transferred to the trained classifier module may be scaled accordingly.

Optionally, evaluating the controlling of the aircraft using the operating control outputs comprises: storing aircraft operating inputs generated during the controlling of the aircraft using the operating control outputs; comparing said stored aircraft operating inputs to a set of target values; and determining a measure of performance based on the comparing.

The aircraft operating inputs may be used to provide a feedback system by which the performance of the aircraft can be monitored. Comparing the operation of the aircraft to a previous operation of the aircraft may allow the authority of control of the aircraft to be transferred to the trained classifier if the trained classifier meets a specified requirement in operation. This requirement in each of a plurality of scenarios may be devised by testers or may come from operational specifications for the aircraft. Accordingly, the authority may be transferred to the trained classifier only where the trained classifier is proven to operate above these requirements.

Optionally, the set of target values comprises a set of threshold values determined based on a prior operation of the aircraft.

In this way, control of the aircraft may be transferred to the trained classifier where the trained classifier is shown to at least match, and preferably exceed, a previous performance of the aircraft which occurred using outputs generated primarily from the aircraft control module.

Optionally, evaluating the controlling of the aircraft using the operating control outputs comprises: receiving data relating to an environmental condition during the controlling of the aircraft; and modifying the measure of performance based on the received data.

In some cases, the performance of the aircraft during operation may be dependent on external environmental factors. By compensating for the environmental conditions, it may be possible to more accurately assess the performance of the aircraft and thereby modify the authority parameter suitably so as not to unwarrantedly increase or decrease the amount of authority provided to the trained classifier module.

Optionally, the aircraft operating inputs comprise signals from at least one of sensor outputs and user inputs associated with an operating state of the aircraft.

In this way, the aircraft control system may control the aircraft based on both the controls received from an operator of the aircraft and may account for environmental conditions and operating states of equipment in the aircraft.

Optionally, the aircraft control system comprises a braking control system.

Braking systems are safety-critical and their specific operation can be highly variable under different scenarios. Therefore, when transferring control of a braking control system from a known or currently used control module to a new control module, such as a module comprising a trained classifier, it is desirable to do so incrementally. This may ameliorate any concerns of pilots and provide evidence that the gradual or stepwise transfer of control is performed with appropriate oversight.

Optionally, the operating control outputs represent a braking profile which specifies an amount of braking to be applied during a braking procedure.

Optionally, the aircraft control system comprises a fuel control system.

Fuel systems are also complex systems which are critical when operating aircraft. It is important to know precisely how much fuel remains and to be able to calculate the rate at which fuel is being consumed when flying aircraft. Accordingly, it is desirable, when transferring control to a trained classifier module, to do so incrementally.

Incrementally transferring control in the manner described can provide assurance that the transfer will lead to predictable and reliable results. For example, the performance of the trained classifier can be evaluated at each step and the system may only proceed to the next step if the performance meets or exceeds expectations.

Optionally, the operating control outputs represent fuel data to be displayed in the aircraft.

A second aspect of the present invention provides a test aircraft comprising the aircraft control system as described above.

A test aircraft implementing the control system as described above may be used by developers and testers of the trained classifier module to evidence the safety of the trained classifier to regulatory bodies and/or pilots of the aircraft which are to be configured with the trained classifier module.

A third aspect of the present invention provides a method of controlling an aircraft, the method comprising: receiving aircraft operating inputs; generate first control outputs for controlling the aircraft, based on the aircraft operating inputs, using an aircraft control module; generate second control outputs for controlling the aircraft, based on the aircraft operating inputs, using a trained classifier; determine a first control value representing at least one of the first control outputs and a second control value representing at least one of the second control outputs; determine an operating control value, at a distance between the first and second control values, the distance being determined by an authority parameter; using the determined operating control value to generate operating control outputs; and controlling the aircraft using the operating control outputs.

In this way, the aircraft may be controlled according to outputs from both a first control module, which is already in operation on a plurality of aircraft, and a new trained classifier which has been trained to control the aircraft. This allows testers and pilots of the aircraft to evaluate the performance of the trained classifier and gain confidence that its introduction into the aircraft is safe. This may also allow regulators and testers to monitor and evaluate the differences in operation of the aircraft between the aircraft control module and the trained classifier module.

Optionally, the method comprises: evaluating the controlling of the aircraft using the operating control outputs; and updating the authority parameter based on the evaluation of the controlling of the aircraft using the operating control outputs.

This may allow the control of the aircraft to be gradually transferred from the aircraft control module to the trained classifier. By updating the authority parameter based on the evaluation, it is possible to increase or decrease the authority provided to the trained classifier based on performance. This may provide an opportunity to assess the trained classifier and ensure that the transfer of control is performed predictably and safely. If the trained classifier doesn't perform as desired or as expected in a given scenario, the authority of the aircraft control module can be increased. Similarly, the system may be configured such that the authority of the trained classifier is only increased if the evaluation shows that the trained classifier module performs better than the aircraft control module.

Optionally, evaluating the controlling of the aircraft comprises comparing the controlling of the aircraft with a prior operation of the aircraft.

In this way, control of the aircraft may be transferred to the trained classifier where the trained classifier is shown to meet or exceed performance of a previous aircraft control module.

Optionally, the comparison of the controlling of the aircraft with a prior operation of the aircraft is modified according to data representing an environmental condition during at least one of the controlling of the aircraft or the prior operation of the aircraft.

In some cases, the performance of the aircraft during operation may be dependent on external environmental factors. By controlling for the environmental conditions, it may be possible to more accurately assess the performance of the aircraft and thereby modify the authority parameter suitably.

Optionally, generating the operating control value comprises determining a weighted average of the first control value and the second control value, wherein weight values applied to the first and second sets of control outputs depend on the authority parameter.

Performing a weighted average of the first and second control value to determine the operating control value may provide an efficient way of determining operating control outputs. This may also allow the authority to be consistently and reliably incremented from the aircraft control module to the trained classifier module.

Optionally, the aircraft operating inputs comprise signals from at least one of sensor outputs and user inputs associated with an operating state of the aircraft.

In this way, the aircraft control system may control the aircraft on both the controls received from an operator of the aircraft and may account for environmental conditions and operating states of equipment in the aircraft.

A fourth aspect of the present invention provides a test system for an aircraft, the test system comprising: a first input interface for receiving aircraft operating inputs; a second input interface for receiving first aircraft control outputs from an aircraft control system; a third input interface for receiving aircraft performance data; an output interface; a processor; and at least one memory comprising computer-readable program code which, when executed by the processor, causes the processor to: process received aircraft operating inputs using an alternative aircraft control system comprising a trained classifier to determine second control outputs; combine the second control outputs with the first control outputs in dependence on at least one weight value to generate intermediate control outputs; output the intermediate control outputs via the output interface to the aircraft control system; evaluate a performance of the aircraft based on received aircraft performance data relating to an operation of the aircraft using the intermediate control outputs; and update the at least one weight value in dependence on the evaluated performance of the aircraft.

Test systems which can control an incremental transfer of authority from an aircraft control system to an alternative aircraft control system, which implements a trained classifier, are desirable for reliably and predictably implementing a transfer of control. By gradually transferring control based on measured performance of the aircraft, it is possible to directly monitor and adapt to changes in performance caused by the aircraft control system.

BRIEF DESCRIPTION OF THE DRAWINGS

Embodiments of the invention will now be described, by way of example only, with reference to the accompanying drawings, in which.

DETAILED DESCRIPTION

Figure 1:
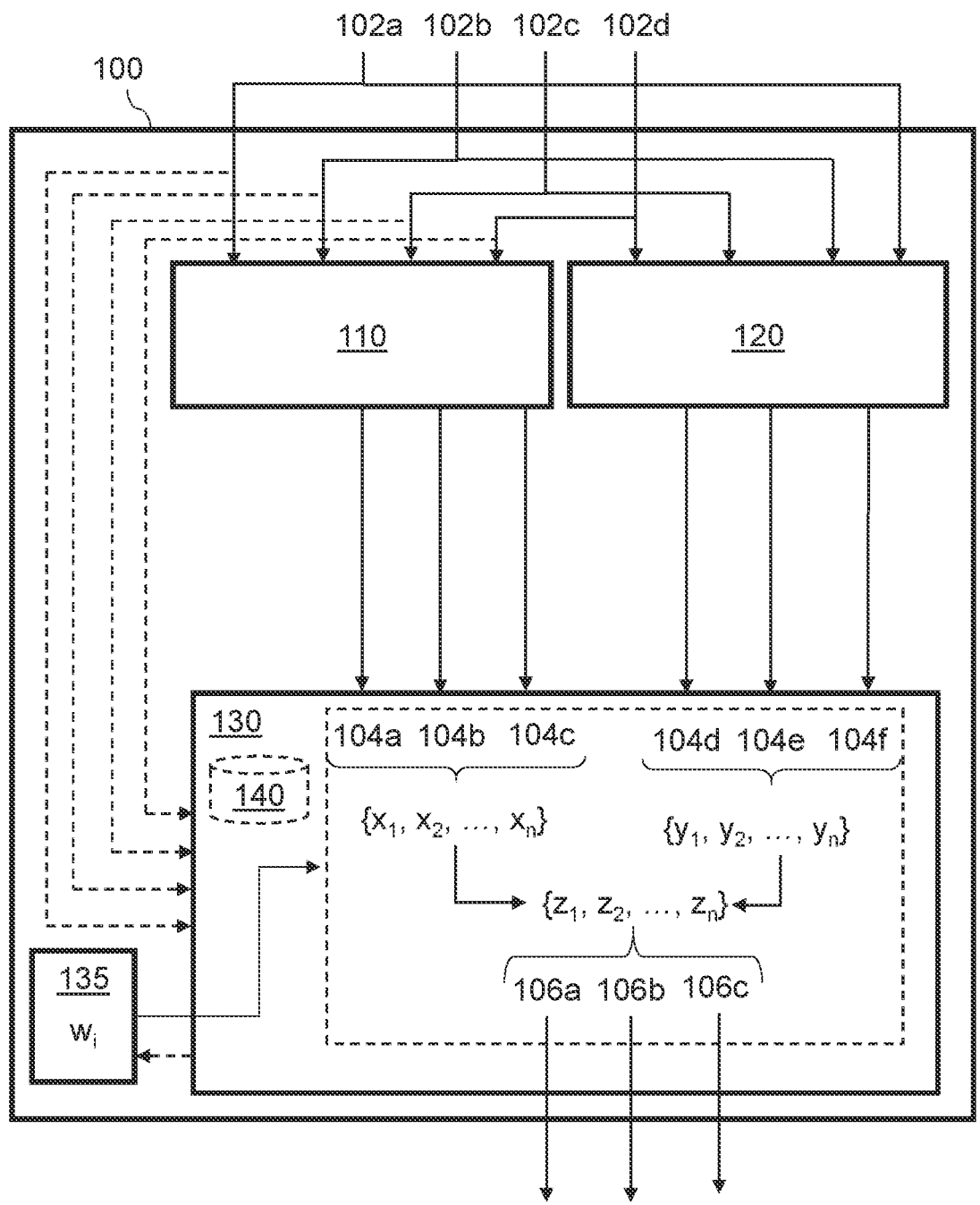
FIG. 1 is a schematic diagram of an aircraft control system according to an example.

Aircraft systems are becoming increasingly complex. As aircraft systems have grown in complexity, automation has been used, for example 'fly-by-wire', to alleviate an increasing burden on pilots of these aircraft. However, developing systems to provide the automation is commensurately complex.

Designers of aircraft control systems, which are used to provide the automation, are considering the inclusion of trained classifiers in aircraft control systems. The use of artificial intelligence in aircraft control systems, such as through the use of trained classifiers, may be beneficial, for example, to operate an aircraft efficiently even in scenarios that may not have been foreseen in design specifications. Further, aircraft control systems employing artificial intelligence may not be bound by the experience of designers of these systems and so may be capable of identifying and operating the aircraft in more efficient ways than other aircraft control systems which are designed to a fixed specification. This is particularly the case when a new aircraft is being designed, since design parameters associated with existing fleets of aircraft may not apply to a new aircraft design.

When implementing new aircraft control systems, certain regulatory bodies may require that developers of the new aircraft control systems provide evidence in support of the safety and reliability of the new aircraft control systems. Also aircraft pilots may be hesitant to immediately switch from a current aircraft control system, which is in operation and has a proven track record for safety and reliability, to a new aircraft control system which, although it is has been tested and proven to be safe for operation, does not have the same reputation and/or acquired track-record for safe operation as the current aircraft control system. Therefore, it would be desirable to alleviate any potential concerns of pilots of aircraft might have regarding aircraft control systems comprising trained classifiers, while also generating sufficient evidence and enforcing sufficient safety measures for regulatory bodies to be satisfied as to the safety and reliability of new aircraft control systems.

Certain examples described herein relate to an aircraft control system comprising both an aircraft control module of known kind and a trained classifier module, wherein the aircraft control system controls the aircraft based on outputs from both the aircraft control module and the trained classifier module. An authority parameter may be used to determine how much of the control of the aircraft is dictated by the aircraft control module and how much of the control of the aircraft is dictated by the trained classifier module. By using both the aircraft control module and the trained classifier module, it is possible to identify how much of a difference in operation of the aircraft the trained classifier module may cause. This would reassure pilots that the operation of the aircraft is safe. It is also possible to identify whether any differences arising between the aircraft control module and the trained classifier module are beneficial to the operation of the aircraft and improve performance.

Beneficially, according to examples, the authority parameter may be updated based on an evaluation of the performance of the aircraft. This allows control of the aircraft to be incrementally transferred to the trained classifier module from the aircraft control module such that at each step or change in authority, only a small transfer is made from the aircraft control module to the trained classifier. Incrementally transferring control to the trained classifier provides the opportunity, at each stage of the transfer, to evaluate the performance of the trained classifier and to conditionally transfer a degree of control to the trained classifier if it meets or exceeds expectations. Further, the confidence of pilots may be maintained.

Certain examples described herein provide a method for controlling an aircraft using the aircraft control module, the trained classifier module, and an aircraft control processing engine to combine the outputs from the two modules and control the aircraft.

FIG. 1 shows an aircraft control system 100 comprising an aircraft control module 110, a trained classifier module 120, and an aircraft control processing engine 130. The aircraft control system 100 may be implemented in a combination of hardware and software components including, for example, at least one processor, at least one memory, and one or more interfaces for interfacing with equipment in the aircraft. The at least one memory includes any suitable combination of transitory and non-transitory storage and stores computer-readable instructions for implementing the aircraft control module 110, the trained classifier module 120, and the aircraft control processing engine 130.

The aircraft control system 100 is adapted to receive aircraft operating inputs 102*a* to 102*d* and to generate operating control outputs 106*a* to 106*c* which are used to control an aircraft. The aircraft control processing engine 130 which receives first control outputs 104*a* to 104*c* and second control outputs 104*d* to 104*f* and uses these outputs 104*a* to 104*f* to generate the operating control outputs 106*a* to 106*c*.

The aircraft control module 110 is an aircraft control module which has been in operation on aircraft that either were in service in the past or are currently in service. This aircraft control module 110 may represent a widely used and trusted control module. In the present example, the aircraft control module 110 is typically a control module which is developed by devising rules governing the operation of the aircraft in a plurality of scenarios and coding these into a software module. Examples of such an aircraft control module 110 include software modules comprising state machines, ladder logic, or program control logic which generates predetermined control outputs based on anticipated inputs. The aircraft module 110 may be implemented as any suitable combination of hardware and software. In prior scenarios, the control outputs 104*a* to 104*c* of the control module 110 would typically have been those used to control an aircraft rather than being inputs to the aircraft control processing engine 130 of the present example.

The trained classifier module 120 is implemented in a suitable combination of hardware and software for generating control outputs 104*a* to 104*f* for controlling the aircraft based on received inputs 102*a* to 102*d*. The trained classifier module 120 comprises a classifier, for example a neural network, or other suitable classifier such as a decision tree, a multilayer perceptron, naïve Bayes, a support vector machine and other suitable classifiers. The classifier in the trained classifier module 120 has been trained in a known way, for example by reference to the operation and behaviour of a known system. This may be performed using a large data set comprising historic data from known aircraft systems, or by being installed on an aircraft in a purely passive role to record data to be used to train the classifier.

The aircraft control processing engine 130 comprises a suitable combination of hardware and software for receiving outputs 104*a* to 104*f* from the aircraft control module 110 and the trained classifier module 120 and for generating control outputs 106*a* to 106*c* for controlling the aircraft. The aircraft control processing engine 130 comprises suitable interfaces for receiving outputs 104*a* to 104*f* from the aircraft control module 110 and the trained classifier module 120, and outputting further control outputs 106*a* to 106*c*.

Figure 2:
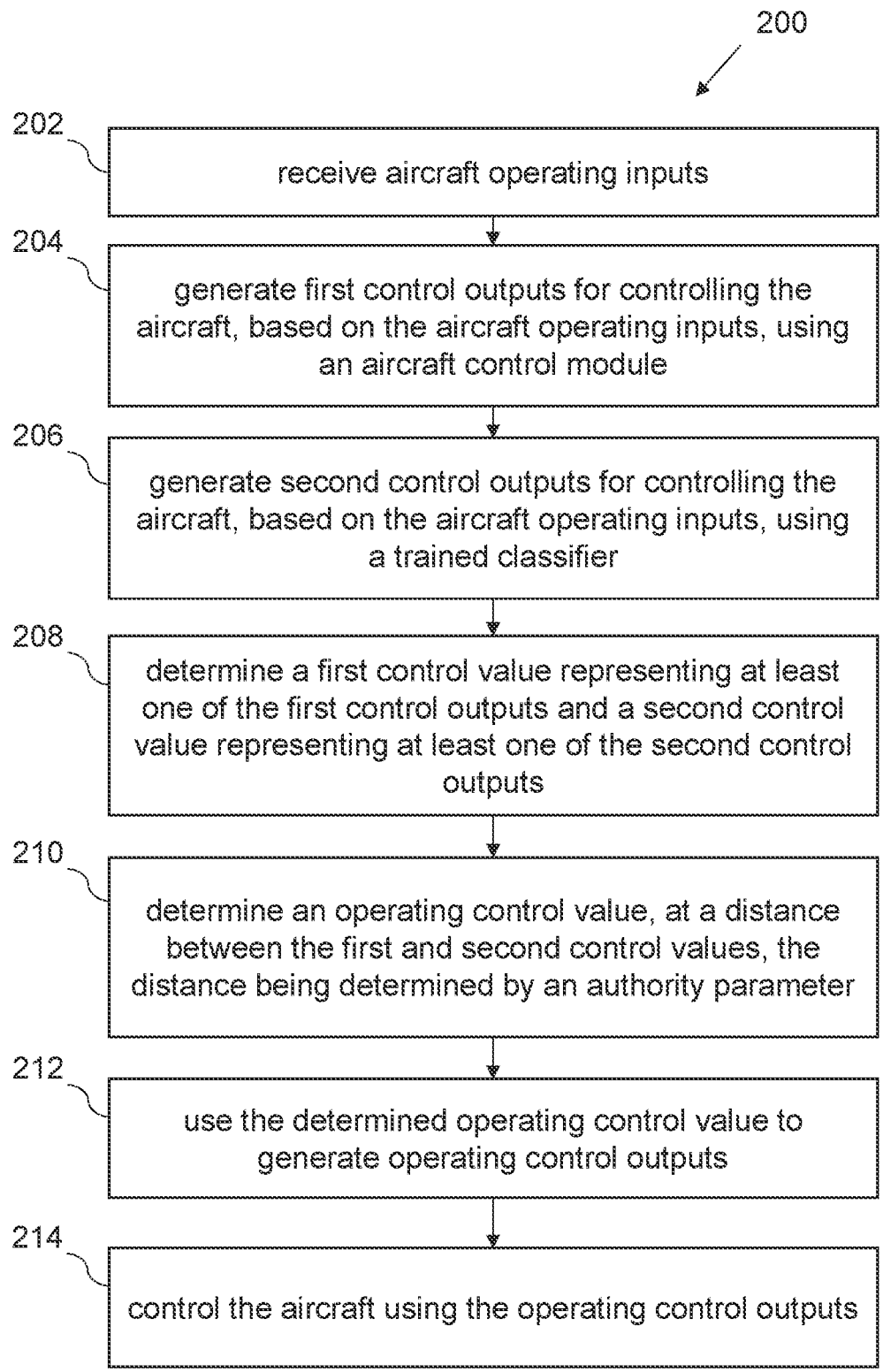
FIG. 2 is a flow chart of a method according to an example.

FIG. 2 shows a method 200, which is implemented by the aircraft control system 100, in the form of a flow chart 202 to 214. The method 200 comprises, at a first block 202, receiving the aircraft operating inputs 102*a* to 102*d*. These aircraft operating inputs 102*a* to 102*d* are received at both the aircraft control module 110 and the trained classifier module 120 and may be a stream of signals continually input to the aircraft control system 100. These aircraft operating inputs 102*a* to 102*d* represent an operating state of the aircraft and include, for example, signals from sensors and signals resulting from user operations and inputs. Signals from user inputs include control signals generated at interfaces such as switches, levers, buttons, inputs from touch screens, and the like. These input control signals are received from any suitable interfaces in the aircraft, for example, flight controls, cabin environment controls, communication controls, and others. The specific nature and origin of the user inputs depends on the systems in the aircraft which the aircraft control system 100 is adapted to control. Signals from sensor outputs include signals from any suitable sensors in the aircraft. These sensors can include environmental sensors, which monitor the environmental conditions of the aircraft, and equipment sensors, which monitor the operational states of equipment in the aircraft.

The method 200 then comprises, at a second block 204, the aircraft control module 110 generating first control outputs 104*a* to 104*c*, based on the received aircraft operating inputs 102*a* to 102*d*, for controlling the aircraft. The aircraft control module 110 receives the aircraft operating inputs 102*a* to 102*d* and processes these inputs 102*a* to 102*d* according to the rules to determine the first control outputs 104*a* to 104*c*. For example, where the aircraft control module 110 is adapted to control a braking system, the aircraft control module 110 may be adapted to receive inputs relating to wheel speed, aircraft speed, and an amount of braking specified at a brake pedal by the pilot. The aircraft control module 110 may process these inputs and determine an amount of braking to be applied. The aircraft control module 110 may then operate the brakes in a manner dictated by the rules coded into the aircraft control module 110 according to the received inputs.

The method 200 also comprises, at a third block 206, the trained classifier module 120 generating second control outputs 104*d* to 104*f*, based on the received operating inputs 102*a* to 102*d*, for controlling the aircraft. For example, where the trained classifier module 120 comprises a trained neural network comprising a plurality of network parameter values, the aircraft operating inputs 102*a* to 102*d* are applied to the neural network and processed according to the network parameter values to generate the second control outputs 104*d* to 104*f*.

In an example, the first and second control outputs 104*a* to 104*f* include output signals, which are suitable for controlling equipment in the aircraft. For example, these outputs 104*a* to 104*f* may be suitable for being directly output to equipment such as power supplies, actuation equipment, and the like. Alternatively, the first control outputs 104*a* to 104*c* and the second control outputs 104*d* to 104*f* may not be suitable for directly controlling equipment but may be processed to generate signals which are suitable to be input to aircraft equipment.

The first control outputs 104*a* to 104*c* and the second control outputs 104*d* to 104*f* are output to the aircraft control processing engine 130. The aircraft control processing engine 130 receives these control outputs 104*a* to 104*f* and generates operating control outputs 106*a* to 106*c* based the first control outputs 104*a* to 104*c* and the second 104*d* to 104*f* control outputs.

The aircraft control processing engine 130 determines a first control value $X_1$ from the first control outputs 104*a* to 104*c* and a second control value $Y_1$ from the second control outputs 104*d* to 104*f* at a fourth block 208 of the method 200. In the example shown in FIG. 1, a plurality of first control values $\{X_1, X_2, \ldots, X_n\}$ are determined from the first control outputs 104*a* to 104*f*, and, similarly, a plurality of second control values $\{Y_1, Y_2, \ldots, Y_n\}$ are determined from the second control outputs 104*d* to 104*f*. It will be appreciated that the total number of values which are determined from the first control outputs 104*a* to 104*c* and the second control outputs 104*d* to 104*f* is dependent on the type of control outputs which are received and the equipment which they are adapted to control. Generally, the first control value $X_1$ and the second control value $Y_1$ comprise different values due to differences in the way the aircraft control module 110 and the trained classifier module 120 are adapted to control the aircraft. In some examples, the trained classifier 120 may control the aircraft more efficiently than the aircraft control module 110.

The method 200 then comprises, at a fifth block 210, the aircraft control processing engine 130 determining an operating control value $Z_1$, at a distance between the first control value $X_1$ and the second control value $Y_2$. The distance is determined by an authority parameter 135 stored in the aircraft control system 100. For example, where the authority parameter 135 specifies that the majority of authority in the aircraft control system lies with the aircraft control module 110, then the operating control value $Z_1$ will be closer to the first control value $X_1$ than to the second control value $Y_1$. Similarly, where the authority parameter 135 specifies that the majority of authority in the aircraft control system lies with the trained classifier module 120, then the operating control value $Z_1$ will be closer to the second control value $Y_1$ than to the first control value $X_1$. In an example, the first control value $X_1$ and the second control value $Y_1$ are scalar values and the distance between them is determined by their respective magnitudes. For instance, the first control value $X_1$ may be a braking order of 90 bar and the second control value $Y_1$ may be a braking order of 111 bar. In this case, if the authority parameter 135 specifies that around 33% of the authority is given to the aircraft control module 110 and around 67% of the authority is given to the trained classifier module 120, then the output control value $Z_1$ would be around 104 bar. That is to say, at a distance of 14 bar from the first control value $X_1$ and at a distance of 7 bar from the second control value $Y_1$. In other examples, the first control value $X_1$ and the second control value $Y_1$ may be multivariate or vectors and the distance between them may be determined by appropriate functions.

In an example, the authority parameter 135 comprises a weight value $W_i$ and generating the operating control value $Z_1$ comprises generating a weighted average of the first control value $X_1$ and the second control value $Y_1$ using the weight value $W_i$. Similarly, in the example shown in FIG. 1, a weighted average of a plurality of first control values $\{X_1, X_2, \ldots, X_n\}$ and a plurality of second control values $\{Y_1, Y_2, \ldots, Y_n\}$ may be generated to determine a plurality of operating control values $\{Z_1, Z_2, \ldots, Z_n\}$. Each of the plurality of first control values $\{X_1, X_2, \ldots, X_n\}$ is averaged with a respective one of the plurality of second control values $\{Y_1, Y_2, \ldots, Y_n\}$. In the example shown in FIG. 1, values of the plurality of first control values are averaged with values of the plurality of second control values having the same subscript. In some examples, the weighted averages between each of the first $\{X_1, X_2, \ldots, X_n\}$ and second $\{Y_1, Y_2, \ldots, Y_n\}$ control values are calculated using the weight value $W_i$, although, in other examples, there may be a plurality of weight values $\{W_1, W_2, \ldots, W_n\}$. Each of the plurality of weight values $\{W_1, W_2, \ldots, W_n\}$ may be used to determine a respective one of the weighted averages between the first control values $\{X_1, X_2, \ldots, X_n\}$ and the second control values $\{Y_1, Y_2, \ldots, Y_n\}$.

The operating control value $Z_1$, or in the example shown the plurality of operating control values $\{Z_1, Z_2, \ldots, Z_n\}$, are then used by the aircraft control processing engine 130 to generate the operating control outputs 106a to 106c, at a sixth block 212 of the method 200. These operating control outputs 106a to 106c are used, at a seventh block 214 of the method 200, to control the aircraft. The operating control outputs 106a to 106c may be directly output to equipment in the aircraft such as actuation equipment, power supplies, computer systems, and the like. Alternatively, or additionally, at least some of the operating control outputs 106a to 106c may be processed and converted to signals suitable for being input to equipment in the aircraft.

The aircraft control processing engine 130 may be further adapted to evaluate the controlling of the aircraft using the operating control outputs 106a to 106c and to update the authority parameter 135 based on the evaluation of the controlling of the aircraft using the operating control outputs 106a to 106c. In this way, the effectiveness of the trained classifier module 120 may be monitored and the influence of the trained classifier module 120 on the operating control outputs 106a to 106c may be incrementally increased. This allows the transfer of control to be regularly monitored and hence can proceed in a regulated and predictable way. Further, this may allow the confidence of pilots of the aircraft to be maintained while the incremental change over to the trained classifier module 120 is performed in small steps based on proven performance. For example, where the authority parameter 135 comprises a weight value $W_i$ for performing a weighted average of the first $X_1$ and second $Y_1$ control values, updating the authority parameter 135 comprises incrementing the weight value $W_i$.

In some cases, the authority afforded to the trained classifier module 120 may be reduced by decrementing the weight value $W_i$. The performance of the aircraft is dependent on a number of factors including the environment in which the aircraft is operated and the evaluation itself is constrained by the data which is gathered to assess the performance of the aircraft. Accordingly, there may be scenarios where the use of the trained classifier module 120 appears to lead to a decrease in performance. For example, the stopping distance of an aircraft may undesirably increase under certain constraints. In such a case, the weight value $W_i$ may be decremented. In an example, the trained classifier module 120 has already been tested and has proven to be safe, and it is expected that the occurrences of decrementing of the weight value $W_i$ are outnumbered by the occurrences of incrementing the weight value $W_i$.

If the trained classifier module 120 is consistently performing below expectations it may be possible to identify this by evaluating the trend in the weight value $W_i$ over time. If the weight value $W_i$ begins to plateau, or is consistently decrementing, this can be used to identify problems in the trained classifier module 120. In such a case, the trained classifier module 120 may then be taken offline for evaluation and/or re-training.

In an example, the evaluating of the controlling of the aircraft using the operating control outputs 106a to 160c is performed continuously during operation of the aircraft control system and the authority parameter 135 is continuously updated. Alternatively, the evaluation is performed periodically or in specific scenarios or under predetermined tests. By performing the evaluation in specific scenarios or under predetermined tests it may be possible to evaluate a broad range of operational states and potential situations while transferring authority of the aircraft control system 100 to the trained classifier module 120.

In some examples, there may be a predetermined number of tests and/or operations which are to be performed before the authority parameter 135 can specify that the operating control outputs 106a to 106c are generated entirely based on the second control outputs 104d to 104f and not the first control outputs 104a to 104c. The evaluation of the controlling of the aircraft may include determining a binary value dependent on whether the performance of the aircraft was acceptable or not. This binary value may determine how the authority parameter 135 is updated and whether the authority of the trained classifier module 120 is increased or decreased.

In other examples, the way in which the authority parameter 135 is updated is dependent on the evaluation of the controlling of the aircraft. In other words, where the authority parameter 135 comprises a weight value, $W_i$, the amount by which the weight value $W_i$ is incremented or decremented is dependent on the evaluation. This can increase the speed with which control is transferred from the aircraft control module 110 to the trained classifier module 120. For example, where the trained classifier module 120 is proving to increase the performance of the aircraft drastically, control may be transferred to the trained classifier module 120 faster by increasing the amount by which the weight value $W_i$ is incremented. Additionally, this may allow control to be transferred back to the aircraft control module 110 by an appropriate amount depending on the performance of the trained classifier module 120. In some examples, the weight value $W_i$ may be modified by a greater amount following a decrease in performance due to the trained classifier module 120 than an increase. In this way, reductions in performance may be penalised to a greater extent than the rewards provided following increases in performance. As a result, the trained classifier module 120 is required to consistently demonstrate adequate or improved performance before authority in the aircraft control system 100 can be fully transferred to the trained classifier module 120. This may increase the standards of consistency which the trained classifier module 120 has to meet to be afforded control of the aircraft.

To evaluate the performance of the controlling of the aircraft, the aircraft control processing engine 130 stores aircraft operating inputs 102a to 102d that are generated during the controlling of the aircraft using the operating control outputs 106a to 106c. The aircraft control processing system 130 compares these stored aircraft operating inputs 102a to 102d to a set of target values 140 and a measure of performance is determined based on the comparing. For example, the set of target values 140 may represent performance thresholds, such as allowable stopping distances, which are determined based on predetermined performance requirements. In the examples shown, the set of target values 140 are stored in the aircraft control system 100. The set of target values 140 may be updated periodically and may represent a previous best performance of the aircraft. In some cases, the set of target values 140 are stored in association with an indication of specific scenarios, or tests, to which they relate.

In some cases, the measure of performance may be a binary measurement which indicates whether the authority of the trained classifier module 120 should be increased or decreased. Alternatively, the measure of performance may be a value which is used to determine by how much the authority of the trained classifier module 120 should be increased or decreased, by modifying the authority parameter 135.

The set of target values 140 may comprise a set of threshold values which are determined based on a prior operation of the aircraft. In this way, performance of the aircraft under the operating control outputs 106a to 106c can be compared to a previous operation of the aircraft and so the authority of the trained classifier module 120 may only be increased if the performance of the aircraft is the same as or better than the performance of the aircraft based on control outputs 104a to 104c from the aircraft control module 110.

In some cases, the environmental conditions in which the aircraft is being operated may have an adverse or a beneficial effect on the performance of the aircraft. This may affect the accuracy of the evaluating of the performance of the aircraft. Accordingly, the evaluating comprises receiving data relating to an environmental condition during the controlling of the aircraft and modifying the measure of performance based on the received data. In this way, the accuracy of the evaluation is increased, and the authority parameter may be more appropriately modified.

Figure 3:
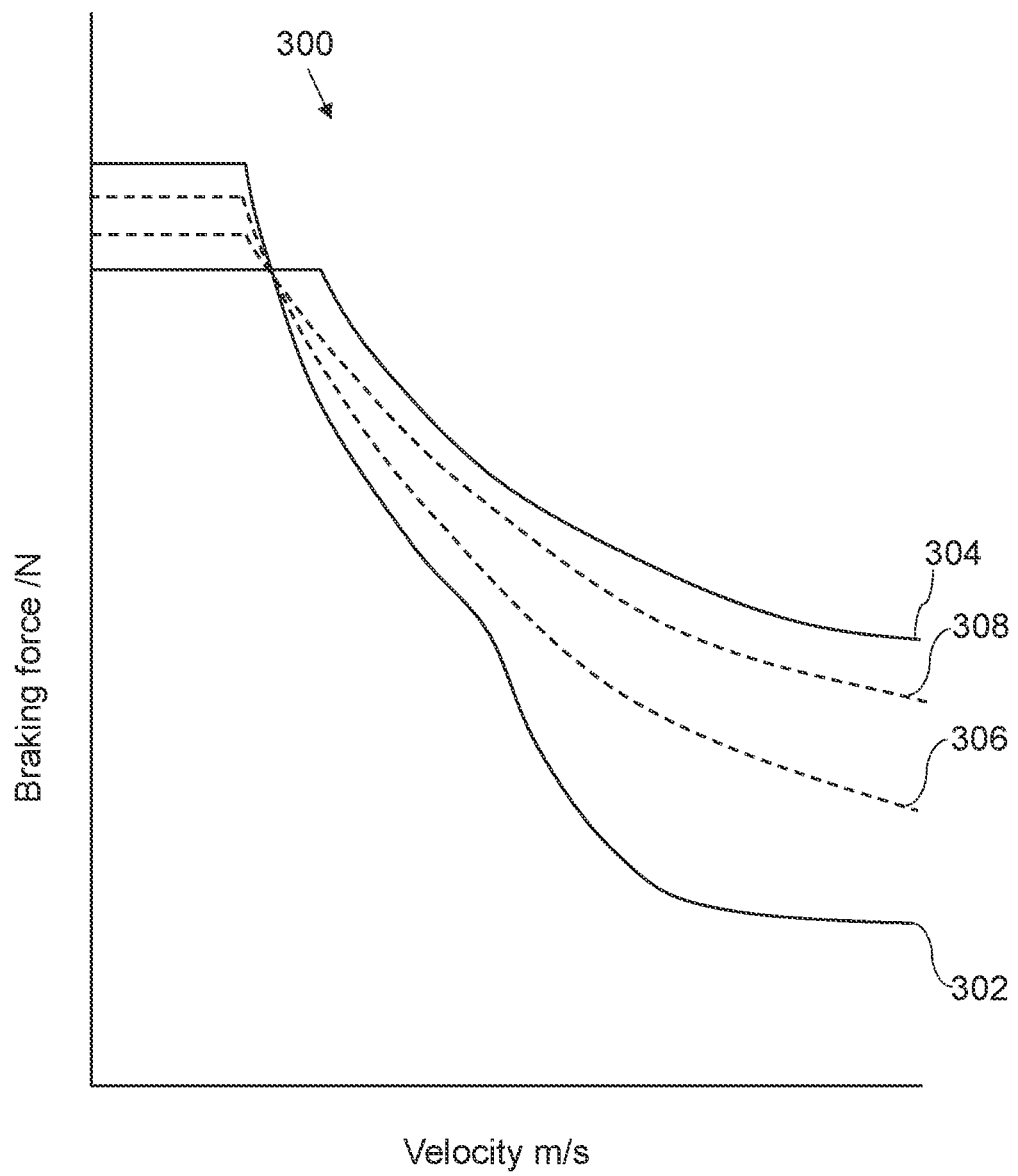
FIG. 3 is a graph illustrating a plurality of braking force profiles according to an example.

In an example, the aircraft control system 100 comprises a braking control system. In this case, the operating inputs 102a to 102d may be received from either or both braking controls operated by a pilot of the aircraft and sensor outputs. Sensor outputs may include wheel speed sensors, pressure sensors monitoring hydraulic fluid lines (in hydraulic braking systems), from avionic equipment in the braking control system, brake temperature sensors and other relevant sensors in the braking system. In this example, the operating inputs 102a to 102d are processed by the aircraft control module 110 to determine first control outputs 104a to 104c which are to be used to operate equipment in the braking control system to provide a desired amount of braking force. For example, the first control outputs 104a to 104c may specify an amount of electrical current to be supplied to coils in the braking system which provide actuation in components of the braking system. These first control outputs 104a to 104c may represent a first braking profile which specifies an amount of braking to be applied to the brakes during a braking procedure. FIG. 3 shows a graph 300 of braking force against velocity for different scenarios, including a first braking profile 302 represented by the first control outputs 104a to 104c.

The trained classifier 120 may also process the aircraft control inputs 102a to 102d to determine second control outputs 104d to 104f representing a second braking profile 304 shown on the graph 300 of FIG. 3. In a first instance, the aircraft control processing engine 130 may process the first control outputs 104a to 104c and the second control outputs 104d to 104f to determine operating control outputs 106a to 106c, which represent a first operating braking profile 306 and which is closer to the first braking profile 302 than to the second braking profile 304.

After a braking procedure is performed according to this first operating braking profile 306, the performance of the aircraft is evaluated and the authority parameter 135 is updated. The evaluation of the performance of the aircraft in this example may be determined based on, for example, a distance travelled before the aircraft stops, an amount of heat generated in the brakes, an amount of g-force experienced by passengers of the aircraft, and other suitable criteria. In some cases, environmental conditions are considered in the evaluation. For example, weather data representing a humidity and/or temperature of the environment during the braking procedure may be used to modify the evaluation to correct for environmental factors. Other factors which may be considered also include, but are not limited to, a wetness of and/or type of surface on which the aircraft performs the braking procedure, a total load weight of the aircraft, and any other appropriate factors.

If the evaluation of the performance of the braking procedure according to the first operating braking profile 306 determines that the braking performance was the same or better than the braking performance under the first braking profile 302, then the authority parameter 135 is updated to increase the authority provided to the trained classifier module 120. Consequently, in future braking procedures the aircraft control processing engine 130 generates operating control outputs 106a to 106c which represent a second operating braking profile 308. This process is repeated, eventually resulting in the second braking profile 304 being used in a braking procedure, thereby gradually transferring control from the aircraft control module 110 to the trained classifier module 120.

In another example, the aircraft control system 100 comprises a fuel control system, which is adapted to determine an amount of fuel in the aircraft and present this information to an operator of the aircraft. In this case, the aircraft operating inputs 102a to 102d are output from fuel sensors used to measure the amount of fuel in the aircraft. The fuel sensors may include sensors which detect the liquid levels in the tank, for example using capacitance probes positioned vertically in the tank. Other sensor types may also be included such as pressure sensors and temperature sensors which may be used to compensate for environmental conditions which cause the fuel to change. Fuel control systems in aircraft are complex due to the difficulty in accurately measuring an amount of liquid in a tank which isn't stationary, and which changes orientation during flight. The shape of the fuel tanks in the aircraft and the position of the sensors within the fuel tanks may also affect the accuracy of the measurement of fuel.

In this example, the aircraft operating inputs 102a to 102d from the fuel sensors are received at the aircraft control module 110 and processed to determine first control outputs 104a to 104c. The first control outputs 104a to 104c may be used to cause a display in the aircraft to show a first fuel level. The trained classifier module 120 also processes the aircraft operating inputs 102a to 102d from the fuel sensors and generates second control outputs 104d to 104f which may be used to cause the display to show a second fuel level. The aircraft control processing engine 130 then processes the first control outputs 104a to 104c and the second control outputs 104d to 104f, as described above, to generate operating control outputs 106a to 106c comprising fuel data. The fuel data is then used to control a display of the aircraft to display an operating fuel level which is between the first and second fuel levels. The accuracy of the operating fuel level can be evaluated by monitoring the fuel level and the range of the aircraft, and in some cases by supplemental fuel measurements made by testing personnel. If the output from the trained classifier module 120 is shown to increase the accuracy of the fuel measurement, then the authority parameter 135 may be modified such that the outputs from the trained classifier module 120 are weighted more heavily than the outputs from the aircraft control module 110.

Figure 4:
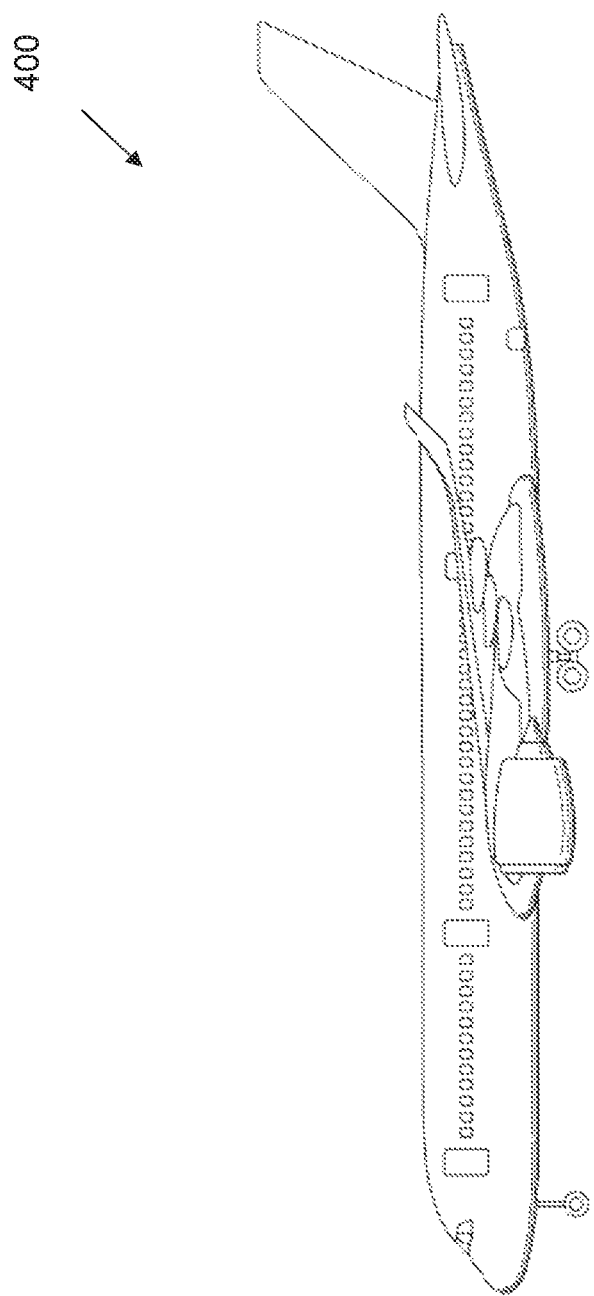
FIG. 4 is a schematic diagram showing a side elevation of a test aircraft according to an example.

FIG. 4 shows a test aircraft 400 comprising an aircraft control system 100 according to the examples described above in relation to FIGS. 1 and 2. In the present example, the test aircraft 400 is a fully operational aircraft. The test aircraft 400 is used to perform a number of tests in which control of the aircraft control system 100 is gradually transferred from the aircraft control module 110 to the trained classifier module 120. For example, a plurality of predetermined test scenarios may be devised to test the performance of the trained classifier module 120. The test aircraft 400 is then operated under this plurality of predetermined test scenarios such that the control of the aircraft control system 100 is gradually transferred from the aircraft control module 110 to the trained classifier module 120. The predetermined test scenarios may represent a wide range of scenarios which are experienced by aircraft during general use. The plurality of predetermined scenarios may also include a plurality of scenarios representing extreme cases in order to demonstrate that the trained classifier module 120 operates appropriately in such conditions.

Alternatively, the test aircraft 400 may not be a fully operational aircraft but may be part of an aircraft. The aircraft control system 100 may be comprised in a test aircraft 400 comprising aircraft systems which the control system 100 is adapted to control. For example, the test aircraft 400 may be missing one or more aircraft systems, such as an avionic system, and may be confined to a test station at which tests are performed on specific aircraft systems which are comprised in the test aircraft 400, such as those controlled by the aircraft control system 100.

Figure 5:
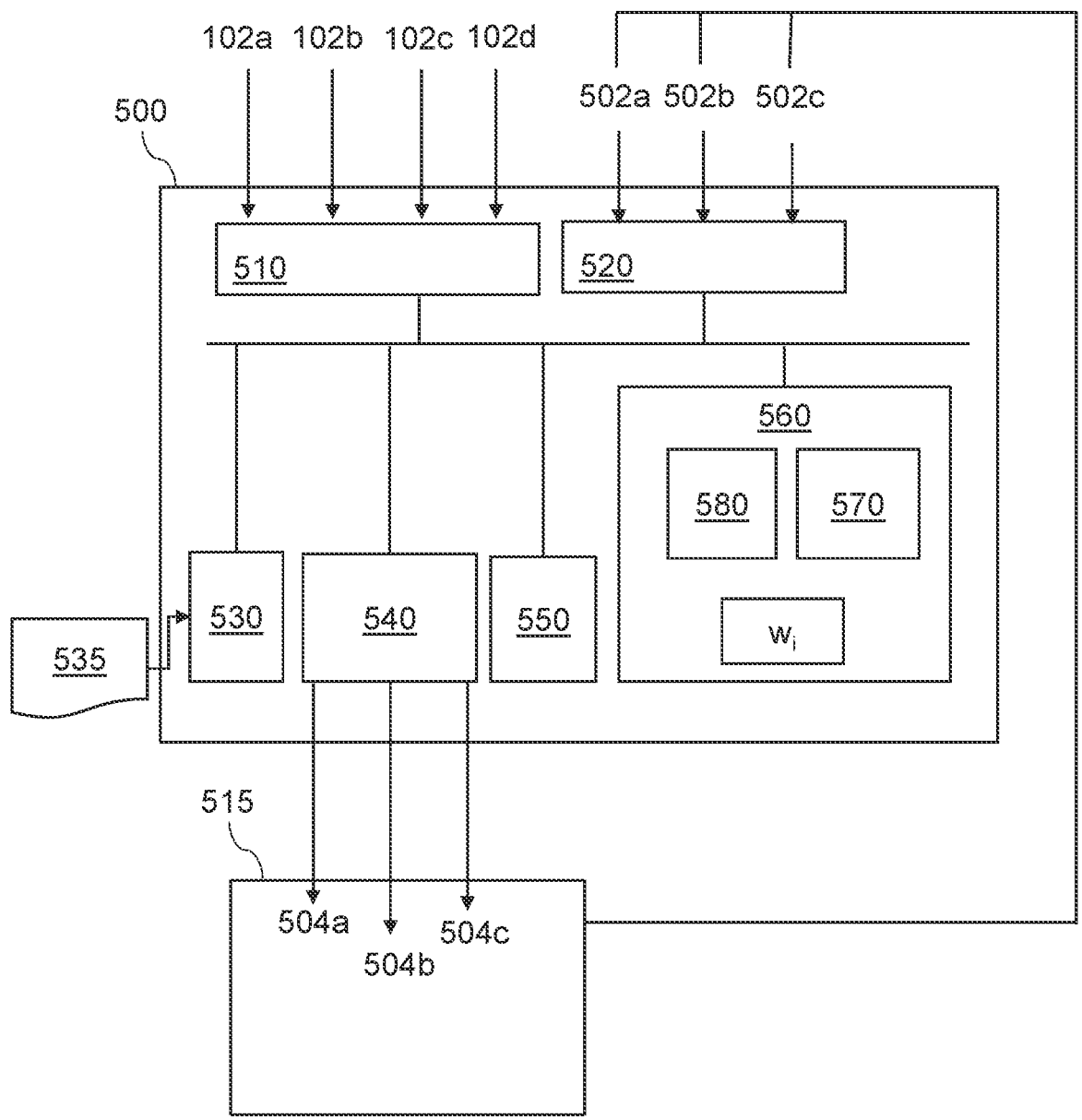
FIG. 5 is a schematic diagram of a test system for an aircraft according to an example.

FIG. 5 shows a test system 500 for an aircraft. The test system 500 comprises a plurality of interfaces including a first input interface 510 for receiving aircraft operating inputs 102a to 102d, a second interface 520 for receiving first aircraft control outputs 502a to 502c from an aircraft control system 515, a third input interface 530 for receiving aircraft performance data 535, and an output interface 540. The first aircraft control outputs 502a to 502c are generated from an external aircraft control system 515 which is currently used in operational aircraft currently in service.

The test system 500 also comprises a processor 550 and at least one memory 560. The components in the test system 500 are connected by a bus for transferring data between the components in the test system 500. The at least one memory 560 comprises computer-readable program code 570 which, when executed by the processor 550, causes the processor 550 to perform a series of steps. The steps include processing the received aircraft operating inputs 102a to 102d using an alternative aircraft control system 580, comprising a trained classifier, to determine second control outputs. The alternative aircraft control system 580 is implemented as a software module in the at least one memory 560. The second control outputs are combined with the first control outputs 502a to 502c in dependence on at least one weight value $W_i$ to generate intermediate control outputs 504a to 504c. The intermediate control outputs 504a to 504c are output via the output interface 540 to the aircraft control system 515. The aircraft control system 515 uses the intermediate control outputs 504a to 504c to control the aircraft and simultaneously and/or subsequently, the test system 500 evaluates a performance of the aircraft based on received aircraft performance data 535 relating to an operation of the aircraft using the intermediate control outputs 504a to 504c. The at least one weight value $W_i$ is updated in dependence on the evaluated performance of the aircraft. This test system 500 may implemented as part of a test set comprising one or more aircraft systems which are to be tested.

The above embodiments are to be understood as illustrative examples. Further embodiments are envisaged. For example, although the aircraft control module 110 is described herein as being a rules-based and comprising, for example, a state machine, in other examples, the aircraft control module 110 may comprise a trained classifier. For example, the aircraft control module 110 may comprise a trained classifier which has been previously deployed in aircraft in service. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims. It is to be noted that the term "or" as used herein is to be interpreted to mean "and/or", unless expressly stated otherwise.

The invention claimed is:

1. An aircraft control system comprising:
   an aircraft control module adapted to receive aircraft operating inputs and, based on the received aircraft operating inputs, generate first control outputs to control equipment of an aircraft, wherein the equipment is separate from the aircraft control module;
   a trained classifier module adapted to receive the aircraft operating inputs and generate second control outputs to control the equipment of the aircraft; and
   an aircraft control processing engine adapted to:
      receive the first control outputs and the second control outputs;
      determine a first control value representing at least one of the first control outputs and a second control value representing at least one of the second control outputs;
      determine an operating control value, at a distance between the first and second control values, the distance being determined by an authority parameter;
      using the determined operating control value to generate operating control outputs;
      control the equipment of the aircraft using the operating control outputs;
      evaluate the control of the equipment of the aircraft; and
      update the authority parameter based on the evaluation of the control of the aircraft.

2. The aircraft control system according to claim 1, wherein the authority parameter comprises a weight value and generating the operating control value comprises generating a weighted average of the first control value and the second control value.

3. The aircraft control system according to claim 2, wherein updating the authority parameter comprises at least one of incrementing or decrementing the weight value.

4. The aircraft control system according to claim 3, wherein an amount by which the weight value is incremented or decremented depends on the evaluating of the controlling of the aircraft.

5. The aircraft control system according to claim 1, wherein evaluating the controlling of the aircraft using the operating control outputs comprises:
   storing aircraft operating inputs generated during the controlling of the aircraft using the operating control outputs;
   comparing said stored aircraft operating inputs to a set of target values; and
   determining a measure of performance based on the comparing.

6. The aircraft control system according to claim 5, wherein the set of target values comprises a set of threshold values determined based on a prior operation of the aircraft.

7. The aircraft control system according to claim 5, wherein evaluating the controlling of the aircraft using the operating control outputs comprises:
   receiving data relating to an environmental condition during the controlling of the aircraft; and
   modifying the measure of performance based on the received data.

8. The aircraft control system according to claim 1, wherein the aircraft operating inputs comprise signals from at least one of sensor outputs and user inputs associated with an operating state of the aircraft.

9. The aircraft control system according to claim 1, wherein the aircraft control system comprises a braking control system.

10. The aircraft control system according to claim 9, wherein the operating control outputs represent a braking profile which specifies an amount of braking to be applied during a braking procedure.

11. The aircraft control system according to claim 1, wherein the aircraft control system comprises a fuel control system,
   wherein the operating control outputs represent fuel data to be displayed in the aircraft, and
   wherein the fuel data is applied to control a display in the aircraft of a fuel level in the aircraft.

12. A test aircraft comprising the aircraft control system according to claim 1.

13. A method of controlling an aircraft, the method comprising:
   receiving aircraft operating inputs;
   generating first control outputs to control the aircraft, based on the aircraft operating inputs, using an aircraft control module;
   generating second control outputs to control the aircraft, based on the aircraft operating inputs, using a trained classifier;
   determining a first control value representing at least one of the first control outputs and a second control value representing at least one of the second control outputs;
   determining an operating control value, at a distance between the first and second control values, the distance being determined by an authority parameter;
   using the determined operating control value to generate operating control outputs;
   controlling the aircraft using the operating control outputs to control at least one of actuation equipment, a display, or a power supply in the aircraft;
   evaluating the control of the aircraft; and
   updating the authority parameter based on the evaluation of the control of the aircraft.

14. The method according to claim 13, wherein evaluating the controlling of the aircraft comprises comparing the controlling of the aircraft with a prior operation of the aircraft.

15. The method according to claim 14, wherein the comparison of the controlling of the aircraft with a prior operation of the aircraft is modified according to data representing an environmental condition during at least one of the controlling of the aircraft or the prior operation of the aircraft.

16. The method according to claim 13, wherein generating the operating control value comprises determining a weighted average of the first control value and the second control value, wherein weight values applied to the first and second sets of control outputs depend on the authority parameter.

17. The method according to claim 13, wherein the aircraft operating inputs comprise signals from at least one of sensor outputs and user inputs associated with an operating state of the aircraft.

18. The method of controlling an aircraft of claim 13, wherein the evaluating of the control of the aircraft includes determining whether advancing the distance towards the second control outputs from the trained classifier module results in the performance of the aircraft at least meeting a performance criterion of the aircraft, and the updating of the authority parameter includes adjusting the authority parameter to cause the distance to further advance towards the second control value.

19. A test system for an aircraft, the test system comprising:
- a first input interface configured to receive aircraft operating inputs;
- a second input interface configured to receive first aircraft control outputs from an aircraft control system, wherein the first aircraft control outputs are generated by the aircraft control system based on the received aircraft operating inputs and are for controlling equipment of the aircraft, the equipment being separate from the aircraft control system;
- a third input interface configured to receiving aircraft performance data;
- an output interface;
- a processor; and
- at least one memory comprising computer-readable program code which, when executed by the processor, causes the processor to:
  - process the received aircraft operating inputs using an alternative aircraft control system comprising a trained classifier to determine second control outputs for controlling the equipment of the aircraft;
  - combine the second control outputs with the first control outputs in dependence on at least one weight value to generate intermediate control outputs;
  - output the intermediate control outputs via the output interface to the aircraft control system to control the equipment of the aircraft;
  - evaluate a performance of the aircraft based on received aircraft performance data relating to an operation of the equipment of the aircraft using the intermediate control outputs; and
  - update the at least one weight value in dependence on the evaluated performance of the aircraft.

20. The aircraft control system of claim 1, wherein when the evaluation of the control of the aircraft indicates that the second control outputs from the trained classifier module at least meets a performance criterion of the aircraft, the update of the authority parameter adjusts the authority parameter to cause the distance to advance towards the second control value.

21. The aircraft control system of claim 20, wherein the aircraft control processing engine is further adapted to:
- incrementally adjust the authority parameter to incrementally advance the distance towards the second control values generated by the trained classifier module, and
- the evaluation of the control of the aircraft includes evaluating whether the incremental advance of the distance enhances the performance of the aircraft.

22. The test system for an aircraft of claim 19, when the evaluation of the performance of the aircraft indicates that the second control outputs from the trained classifier at least meets a performance criterion of the aircraft, the update of the at least one weight value is adjusted to increase a weight applied to the second control outputs in the combination of the second and first control outputs to generate the intermediate control outputs.

23. The test system for an aircraft of claim 22, wherein the processor, when executing the computer-readable program code, further:
- incrementally adjusting the at least one weight value to increase the weight given to the second control outputs to generate the intermediate control outputs, and
- the evaluation of the performance includes evaluating whether the incremental adjustment of the at least one weight value enhances the evaluated performance of the aircraft.

24. The test system of claim 19, wherein the equipment is a braking system of the aircraft.

* * * * *